United States Patent [19]

Norman et al.

[11] 4,089,940

[45] May 16, 1978

[54] PROCESS FOR THE THERMOCHEMICAL PRODUCTION OF HYDROGEN

[75] Inventors: John H. Norman; John L. Russell, Jr., both of La Jolla; John T. Porter, II; Kenneth H. McCorkle, both of Del Mar; Thomas S. Roemer, Cardiff; Robert Sharp, Del Mar, all of Calif.

[73] Assignee: General Atomic Company, San Diego, Calif.

[21] Appl. No.: 786,009

[22] Filed: Apr. 8, 1977

Related U.S. Application Data

[63] Continuation-in-part of Ser. No. 601,917, Aug. 4, 1975, abandoned.

[51] Int. Cl.$^2$ .......................... C01B 1/02; C01B 7/18; C01B 7/14; C01B 7/14; C01B 17/74
[52] U.S. Cl. .................. 423/648 R; 423/481; 423/500; 423/522; 423/539; 423/579
[58] Field of Search .............. 423/648, 539, 481, 522, 423/500, 579

[56] References Cited

U.S. PATENT DOCUMENTS

| 2,143,222 | 1/1939 | Heath ............................. 423/481 X |
| 2,406,930 | 9/1946 | Titlestad ............................. 423/522 |
| 3,365,276 | 1/1968 | Childs et al. ......................... 423/648 |
| 3,888,750 | 6/1975 | Brecher et al. ................. 423/539 X |
| 3,929,980 | 12/1975 | Abraham et al. ..................... 423/648 |

OTHER PUBLICATIONS

Mellor's Comp. Treatise on Inorg. and Theo. Chem., Supp. II, Part I, 1956 Ed., p. 865, Longmans, Green & Co., N. Y.
Jacobson's "Encyclopedia of Chem. Reactions", vol. 3, 1949 Ed., p. 709, Reinhold Pub. Corp., N. Y.

*Primary Examiner*—Edward Stern
*Attorney, Agent, or Firm*—Fitch, Even, Tabin & Luedeka

[57] ABSTRACT

Hydrogen is thermochemically produced from water in a cycle wherein a first reaction produces hydrogen iodide and $H_2SO_4$ by the reaction of iodine, sulfur dioxide and water under conditions which cause two distinct aqueous phases to be formed, i.e., a lighter sulfuric acid-bearing phase and a heavier hydrogen iodide-bearing phase. After separation of the two phases, the heavier phase containing most of the hydrogen iodide is treated, e.g., at a high temperature, to decompose the hydrogen iodide and recover hydrogen and iodine. The $H_2SO_4$ is pyrolyzed to recover sulfur dioxide and produce oxygen.

15 Claims, No Drawings

PROCESS FOR THE THERMOCHEMICAL PRODUCTION OF HYDROGEN

This application is a continuation-in-part of our earlier application Ser. No. 601,917, filed Aug. 4, 1975, now abandoned.

This invention relates to the production of hydrogen and more particularly to cycles for producing hydrogen from water using thermochemical reactions.

Nuclear reactors built for commercial power generation produce large quantities of heat which has heretofore generally been used for the generation of steam to power turbines which drive electrical generators. The cost of producing hydrogen in commercial quantities has risen substantially with the recent rise in the price of natural gas and petroleum feed stocks from which it has heretofore generally been produced. The electrolytic decomposition of water provides another obvious way of producing elemental hydrogen; however, the high cost of electrical power to effect such electrolytic decomposition has heretofore made this process economically impractical on a very large commercial scale.

In addition to its present chemical usages, hydrogen has been mentioned as a possible way of storing electric energy until needed, and then using fuel cells or combustion processes to generate electricity. However, the high cost of hydrogen has heretofore limited its potential use in this fashion.

Various thermochemical reactions have been proposed for the creation of hydrogen, and from an efficiency standpoint, these appear eminently sensible. However, from a practical standpoint, none of these thermochemical processes has been without its drawbacks. For example, the direct thermal decomposition of water would require temperatures well above 2000° C., which presently render this process inefficient and apparently impractical for commercial implementation in the near future.

Various series of chemical reactions have been proposed as cycles for arriving at the end result of creating hydrogen from water; however, these too have not been without their problems. For example, the decomposition of an iodide compound has been proposed and appears to be quite practical; however, there are problems involved in the commercial execution of the remainder of the chemical reactions needed to complete such a thermochemical cycle. For example, when ammonium iodide is employed as the compound to be decomposed, its formation from $SO_2$, $I_2$, $H_2O$ and $NH_3$ produces ammonium sulfate as a by-product, which is proposed to be regenerated by a reaction with sodium sulfate; however, there are certain difficulties in carrying out the rather complex reactions necessary to effect the overall regeneration of the sodium sulfate that render this cycle presently disadvantageous. Another proposed cycle utilizes the thermal decomposition of hydrogen iodide, which is practical at temperatures well within the range of those available in nuclear reactors; however, there have been difficulties in practically creating hydrogen iodide from water, particularly in achieving separation of the reaction products, so that improvements therein have been sought.

It is an object of the present invention to provide an efficient and economically practical process for producing hydrogen from water utilizing the decomposition of hydrogen iodide. It is a more specific object of the invention to provide an economically feasible thermochemical cycle for the production of hydrogen from water based upon the decomposition of hydrogen iodide wherein an efficient and practical process for the production of hydrogen iodide is utilized. These and other objects will be apparent from a reading of the following detailed description.

Basically, it has been found that hydrogen iodide can be produced and isolated in an efficient and practical manner so as to render it available for decomposition to hydrogen plus iodine. More specifically, it has been found that the reaction of iodine, sulfur dioxide and water can be controlled in a manner so as to yield two liquid phases which are practicably separable from each other. From one of these phases, hydrogen iodide may be derived, and from the other phase, sulfuric acid may be derived. As a result of this improvement in the production reactions, the overall chemical cycle becomes eminently adaptable to large scale, continuous flow processing which is amenable to automatic control.

This particular thermochemical cycle is amenable to operation at 30 to 60 percent efficiency, and all of the individual steps can be carried out as either a substantially liquid reaction or a gas-phase reaction which is considered to be a significant engineering advantage over other thermochemical cycles which require solids-handling. Moreover, the particular heat requirements of this cycle are well adaptable to the output capability of nuclear reactors, particularly high temperature, gas-cooled reactors which have available heat at temperatures as high as about 950° C. The abbreviated chemical equations describing the overall thermochemical cycle are as follows:

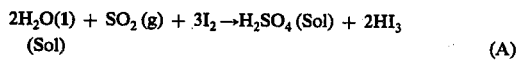

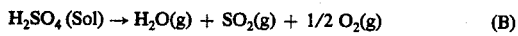

The chemical reaction set forth above as equation A is referred to as the Bunsen reaction, and its performance is a key to the overall feasibility of the thermochemical cycle. One difficulty is that the reaction products, sulfuric acid and hydrogen iodide, are not generally separable by distillation. However, it has been found that by carrying out the Bunsen reaction in the presence of an excess of both sulfur dioxide and iodine, relative to the amount of water available to take part in the reaction, a two-phase reaction mixture is created which is susceptible to liquid-liquid separation on a commercially practicable basis. Sulfur dioxide is preferably provided in an amount sufficient to saturate the solution at the working pressure. The more dense or heavier phase contains the major fraction of the excess $SO_2$ and $I_2$ reactants plus the major portion of the hydrogen iodide that is produced. Most of the hydrogen iodide is present in the form of $HI_3$ and higher polyiodides, such as $HI_5$ and $HI_7$. These iodides contribute to the distinct phase separation, and the term "hydrogen iodide" is used to generally denote HI as well as $HI_3$ and higher hydrogen polyiodides. Water serves not only as one of the reactants in the Bunsen reaction but also as a part of the medium wherein the reaction occurs, and both phases contain water.

The reaction system may be maintained at nonambient pressures and/or temperatures, and the resultant yields will depend on these conditions. As indicated above, if this reaction is carried out under appropriate conditions wherein both an excess of sulfur dioxide and an excess of iodine are present, a two-phase situation is created consisting of two distinct water-containing phases that can be efficiently separated. Of course, the Bunsen reaction is a reversible reaction which does not go to completion, and the equilibrium constants and kinetic considerations determine the extent to which the reaction proceeds. This fact, coupled with the fact that water is both a reactant and a solvent for both phases, renders precise definition of the relative amounts somewhat difficult. In general, although dependent somewhat upon the temperature, about 10 percent of the water which is present can take part in the reaction regardless of the excess amounts of $SO_2$ and $I_2$, with the remainder of the water fulfilling its function as a solvent component. Thus, it is appropriate to base any stoichiometric calculations upon such a 10 percent figure, and this portion is referred to as the reacting water.

Sulfur dioxide must be present in excess to aid in driving the reaction to the right. Supplying $SO_2$ at atmospheric pressure provides an adequate amount of sulfur dioxide in the reaction mixture, and although the reaction may be carried out under greater than atmospheric pressure, there does not appear to be any substantial increase in yield as a result. Temperature is not critical to obtaining the phase separation, and reduced temperatures, e.g., down as low as about $-60°$ C., might be used should it be desired to provide increased concentrations of $SO_2$ while remaining at atmospheric pressure. In general, operation at room temperature (i.e., about 21° C.) and atmospheric pressure maintains the sulfur dioxide at a sufficient chemical activity in the liquids so as to effectively drive the reaction to the right. However, operation well above room temperature may also be used, and the solubility of $I_2$ increases with temperature. Overall, the use of temperatures between about $-30°$ C. and about 150° C. is generally contemplated, at appropriate pressures to avoid undesired boiling, and temperatures between about 20° C. and 120° C. are generally preferred even though colder temperatures generally enhance product yield based upon a fixed amount of dissolved $I_2$.

Gaseous $SO_2$ may be delivered by bubbling it through the liquid system where the reaction occurs, and it is convenient to simply carry out the reaction under saturation conditions with $SO_2$ at a delivery pressure of at least about one atmosphere. At a delivery pressure of one atmosphere and at room temperature or above, sulfur dioxide dissolves in the aqueous solutions in a molar amount more than the stoichiometric amount of reacting water present. By bubbling $SO_2$ through the reaction mixture, additional $SO_2$ is continuously available to dissolve in the liquid system to replace that which reacts to form $H_2SO_4$.

As earlier indicated, iodine is also supplied in an excess amount based upon the reacting water, and preferably iodine is supplied in an amount approaching the saturation concentration of iodine in the reaction mixture. In addition to driving the Bunsen reaction to the right by the law of mass action, iodine complexes with the hydrogen iodide reaction product and creates hydrogen polyiodides ($HI_3$, $HI_5$, $HI_7$, etc.) and ultimately the distinct two-phase liquid system, thus further contributing to the efficiency of the system. If the reaction is carried out at room temperature and at a ratio of 0.5 gram of $I_2$ for each gram of $H_2O$, a single phase reaction system results that has the characteristic yellow color of the $HI.SO_2$ complex. However, as the amount of $I_2$ is increased, the liquid system takes on a darker color which is indicative of the presence of the polyiodides. The polyiodide acids, which are sometimes herein referred to as $HI_3$, are considered to be complexes wherein the HI and the $I_2$ have a stronger attraction for each other than exists between the HI and the $SO_2$.

When the $I_2$ level reaches about 1.8 grams per gram of $H_2O$, phase separation begins to occur; and above about 2 grams, a substantial separation of the two liquid phases (and thus a separation of the sulfuric acid and hydrogen iodide reaction products) is accomplished. Iodine at these levels is not soluble in water alone but dissolves readily in the reaction mixture. The affinity of these polyiodide acids for water and the fact that the complexes thus formed with water reject the sulfuric acid solution are believed to account for the formation of the lighter phase which separates, with the chemical reaction continuing mainly in the heavier phase as all of the reactants are there at high concentrations.

Although the reaction can be carried out as a batch process, because of the excellent phase separation which is accomplished, the process lends itself to continuous and large-scale production operation. Separation of the two phases and their subsequent treatment by known techniques, while continuing to add the reactants to the heavier phase, provides an attractive overall operation. Moreover, the fact that all the reactions are substantially in the liquid phase, or in the gas phase, facilitates transport, automatic control and instrumentation of the various steps.

Depending upon the chosen mode of closing the cycle and the recovery techniques chosen, various treatments of the two individual phases will be carried out to isolate the desired products in purified form.

In the preferred recovery method, the heavier phase is separated from the lighter, less dense phase and may be filtered, if necessary, should there be any precipitated iodine or possibly sulfur to be removed. Next, the product stream is supplied to a still in order to boil off the unreacted sulfur dioxide, leaving bottoms of hydrogen iodide and water. At this point in the process, should there by any $H_2SO_4$ remaining, it reacts with $HI_3$ (viz. the reversible main reaction) until it is removed.

The bottoms are then further treated to separate the hydrogen iodides, as by using azeotropic distillation techniques, with or without additives (.e.g., $H_3PO_4$). The hydrogen iodides may be condensed or may be directly fed to a decomposition reaction vessel for recovery of hydrogen. Thus hydrogen iodide in a substantially dry condition can be distilled and can be thereafter pyrolyzed in a reaction chamber to produce gaseous hydrogen and iodine. It is reasonable to consider returning the HI-poor, iodine-water system, remaining from such an azeotropic separation to the initial reactor for HI enrichment. Alternatively, instead of using azeotropic separation, the bottoms may be completely vaporized with only prior separation of sulfur dioxide and then heated so that the hydrogen iodide fraction decomposes to the extent determined by thermodynamics, and hydrogen may be directly recovered after condensation of the other vapors.

Hydrogen iodide can be extremely corrosive; and thus, resistive metals and glass (in particular quartz) have been employed in making apparatus suitable for the decomposition of HI. Decomposition of HI may be carried out using known technology, e.g., photolytically or pyrolytically. Pyrolysis may be effected at elevated temperatures and pressures, and the temperature needed for achieving practically useful rates of pyrolysis is, to a first approximation, inversely proportional to the pressure. Practical rates can be accomplished without the use of catalysts at temperatures of about 300° C. to 400° C., coupled with pressures in the range of 40 to 80 atmospheres. For pressures in the 1 to 3 atmosphere range, temperatures required to achieve practical pyrolysis rates are about 625° C. to 725° C. Preferably, temperatures between about 325° C. and 350° C. are used at pressures between about 45 and 90 atmospheres. However, such temperature requirements for decomposition are greatly reduced when a catalyst, such as platinum or ruthenium, is employed.

In a pyrolysis reaction, gaseous molecular hydrogen is produced along with iodine, with the iodine being relatively easily condensed to a liquid at a temperature below 180° C. Alternatively, molecular hydrogen might be selectively diffused from the reaction zone or separated centrifugally. Hydrogen iodide that is carried over is separated from the hydrogen by condensation at a temperature of about 100° C. or below and is returned to the hydrogen iodide stream being supplied to the decomposition vessel. If vapor-phase pyrolysis is carried out at sufficiently high pressures and low temperatures, *in situ* condensation of iodine may be effected shortly after its formation. For such operation under isothermal conditions, the temperature should be maintained about 115° to 300° C. and a pressure of at least about 10 atm. The use of a catalyst is beneficial at such low temperatures because the reaction proceeds quite slowly without one. Such resulting condensation of iodine is a driving force which considerably extends the degree of dissociation of hydrogen iodide, thus reducing the recycle of hydrogen iodide by driving the pyrolysis nearer completion and benefitting overall efficiency. Such isothermal conditions may also be advantageously employed when treating the entire heavier phase after separating only sulfur dioxide.

Thermodynamically, it is also possible to enhance the decomposition of HI, with or without the presence of generally noninterferring gases, such as $H_2O$ or $I_2$, by reacting the $H_2$, which is being formed, with some other substance, such as a reducible carbon compound (forming for instance methane), and thereby fixing the hydrogen. Reaction with an alcohol or with an olefin having not more than five carbon atoms to form a paraffin may also be used. Accordingly, the recovery of hydrogen is intended to include its recovery in molecular or in fixed form. This fixed form of hydrogen may later be treated in a manner to release molecular hydrogen, as by catalytically cracking the saturated hydrocarbon or steam-reforming methane.

Another way of recovering hydrogen without totally separating hydrogen iodide and water is to distill the degassed heavier phase to produce an aqueous hydrogen iodide solution containing at least about 40 w/o hydrogen iodide. Such a hydrogen iodide solution will react with an alkene or a secondary or a tertiary alcohol to form an alkyl iodide, and preferably such a compound is chosen having not more than five carbon atoms. Alkyl iodides are readily cracked to form alkenes and molecular hydrogen.

The lighter phase is preferably heated in a stipper 11 to first drive off most of the sulfur dioxide, water and iodine, for example, by employing a temperature of about 200° C. at atmospheric pressure. These vapors are condensed and recovered for reuse. Nonatmospheric pressures may be used, if desired, to substantially change the temperature, e.g., to lower it to as low as about −15° C. The resulting sulfuric acid-water stream is then supplied to a still to separate the remaining water and any hydrogen iodide by distillation (any residual iodine is also removed in this step); and thereafter, the sulfuric acid is vaporized by heating to a temperature of at least about 335° C. (its boiling point at one atmosphere).

The sulfuric acid vapors are then transformed into water and sulfur trioxide, which in turn breaks down generally in the presence of a catalyst to sulfur dioxide and oxygen at high temperatures. See for example, U.S. Pat. No. 3,888,750, issued June 10, 1975 to Brecher et al., wherein the thermochemical decomposition of sulfuric acid with the resultant production of oxygen, sulfur dioxide and water is illustrated and described in detail.

As one example, the sulfuric acid vapors may be transferred to a decomposition chamber wherein a temperature between about 400° C. and about 950° C. is maintained to effect catalytic decomposition. The decomposition chamber system can be recuperatively cooled to condense $SO_2$ and $H_2O$ in a manner so that the recombination reaction between $SO_2$ and $O_2$ to form $SO_3$ is insignificant. In any continuous system, cooling is used to separate the products of the pyrolysis, and $H_2SO_4$ and $H_2O$ are condensed leaving $O_2$ and $SO_2$. This $H_2SO_4$ aqueous solution may be recycled to the still where $H_2O$ is separated from $H_2SO_4$. A mixture of $SO_2$ and $O_2$ gas remains after such cooling and condensation of $H_2SO_4$(sol.), and the sulfur dioxide can then be easily separated from the oxygen by condensation, by selective diffusion or possibly by reacting it with $I_2$ and $H_2O$ for return to the main reaction chamber. The oxygen is then available as an essentially pure by-product of the overall water-splitting process.

The system is considered to have very good overall heat efficiency in spite of the fact that only about 5 mole percent of the water inventory is recovered per cycle as hydrogen. The system is excellently suited for utilization of the high-temperature heat available from a gas-cooled nuclear reactor, which may be operated to produce process heat at coolant temperatures up to about 950° C. as generally disclosed in *Power Engineering*, April 1973. As a result, the energy input needed for the various steps of the system, namely: to supply the heat for all of the various distillation states and to provide the heat for the decomposition of the sulfuric acid and sulfur trioxide and of the hydrogen iodide, at the temperatures desired, is readily available from such a high-temperature reactor coolant stream.

As earlier indicated, the nature of the main reaction, the various distillation separations, and ultimate gaseous pyrolysis render the overall system amenable to large-scale, continuous flow operation which is susceptible to automatic control. Accordingly, the invention is considered to provide substantial improvements in the production of hydrogen by thermochemical reactions, plus an opportunity for efficiently utilizing heat available from a nuclear reactor, particularly high-temperature process heat available from a gas-cooled nuclear reactor. It is also anticipated that the invention may be suitably employed in combination with appropriate solar and thermonuclear heat sources when such are developed.

The following Example illustrates an overall reaction utilizing the present invention; however, it should be understood that the Example is only exemplary and does not constitute limitations upon the scope of the invention which is defined solely by the claims at the end of this specification.

EXAMPLE

The following ingredients are combined in a reaction chamber and caused to react at a temperature of about −10° C. and under a pressure of 1 atmosphere: 15 grams of water, 10 grams of sulfur dioxide, and 44 grams of iodine. The reaction readily proceeds, two distinct phases are observed being created with the lower, heavier phase being generally very dark in color. The above quantities produce 3.7 g. of recoverable $H_2SO_4$ as a 42 w/o solution, and twice as many moles of recoverable hydrogen iodides in the heavy phase.

After about 5 minutes, the reaction is essentially complete, and the less dense, upper phase is suitably separated. This separated lighter phase is subjected to a temperature of about 200° C. at atmospheric pressure to remove the minor amounts of sulfur dioxide and iodine and most of the water that will be present in this phase. The concentrated $H_2SO_4$ is transferred to apparatus suitable for distillation, and the remaining water is distilled from the sulfuric acid. Thereafter, the sulfuric acid is heated to a temperature of about 335° C. at a pressure of about 1 atmosphere to vaporize it. The vapors are then subjected to a temperature of about 750° C. at atmospheric pressure in the presence of a platinum catalyst for a few minutes to break them down to sulfur dioxide, water and oxygen. Undecomposed sulfur trioxide is removed with most of the water upon cooling. The remaining water and sulfur dioxide are condensed at a temperature of about −30° C. and atmospheric pressure and can be reused in the main reaction.

The heavier phase is transferred to a distillation apparatus to first remove the sulfur dioxide by heating under vacuum to about 50° C. The sulfur dioxide is condensed and is available for return to the main reaction. A second distillation is then effected to vaporize the hydrogen iodides and separate them from the water and the excess iodine, using conditions which will allow separation of the hydrogen iodide-water iodineazeotrope.

Thereafter, the hydrogen iodide is pyrolyzed in a quartz vessel without catalyst at a temperature of about 600° C. and atmospheric pressure for 2-5 minutes, creating hydrogen and iodine. Condensation at a temperature of below 115° C. produces condensed $I_2$ which is available for return to the main reaction. At a temperature of around −80° C. the HI condenses and is available for recycle leaving a purified $H_2$ gas stream.

Measurements of the hydrogen and oxygen produced show that the expected thermodynamic yields for the overall process are accomplished. Based upon an overall material balance, it is calculated that nearly 100 percent of the hydrogen of the water which is converted into hydrogen iodide is recovered, and the overall process is considered to be efficient and well-suited for utilization of the hot coolant stream from a nuclear reactor for a process heat application.

Although the invention has been described with regard to certain preferred embodiments, it should be understood that changes and modifications as would be obvious to one having the ordinary skill in this art may be made without departing from the scope of this invention which is defined by the claims appended hereto.

Various of the features of the invention are set forth in the claims which follow:

WHAT IS CLAIMED IS:

1. A process for the thermochemical production of hydrogen from water, which process comprises the steps of making hydrogen iodide and $H_2SO_4$ by the reaction of iodine, sulfur dioxide and water, said reaction being carried out with sulfur dioxide and iodine present in stoichiometric excess with respect to the reacting water and at a temperature above about −60° C. to cause two distinct aqueous phases to be formed, a lighter sulfuric acid-bearing phase and a heavier hydrogen iodidebearing phase, said lighter phase containing most of said $H_2SO_4$ which is produced and said heavier phase containing most of said hydrogen iodide which is produced, separating said heavier phase from said lighter phase, treating said hydrogen iodide from said heavier phase to cause the decomposition thereof and recovering hydrogen and iodine.

2. A process in accordance with claim 1 wherein said reaction is carried out employing an amount of iodine sufficient to substantially saturate said heavier aqueous phase.

3. A process in accordance with claim 1 wherein sulfur dioxide is provided in an amount sufficient to substantiallly saturate said heavier aqueous phase at the delivery pressure.

4. A process in accordance with claim 1 wherein said reaction is carried out at a temperature of between about 20° C. and about 120° C.

5. A process in accordance with claim 4 with said reaction being carried out under conditions wherein at least 44 grams of iodine are provided for each 15 grams of water which are provided.

6. A process in accordance with claim 1 wherein the reactants are fed continuously to a reaction zone and wherein said lighter phase and said heavier phase are continuously separated from each other.

7. A process in accordance with claim 1 wherein said reactants are continuously fed to a reaction vessel and wherein batches of said heavier phase and said lighter phase are removed and separated from each other.

8. A process in accordance with claim 1 wherein said separated lighter phase is first distilled to remove hydrogen iodide, iodine and water and the remainder is thermally decomposed to form sulfur dioxide, water and oxygen in a vapor-phase reaction.

9. A process in accordance with claim 8 wherein recuperative cooling is carried out in combination with said vapor-phase decomposition so as to recover sulfur dioxide and water by condensation without significant recombination thereof.

10. A process in accordance with claim 1 wherein said separated heavier phase is distilled to produce hydrogen iodide in a substantially dry condition and wherein said dry hydrogen iodide is pyrolyzed in a reaction chamber to produce gaseous hydrogen and iodine.

11. A process in accordance with claim 10 wherein said iodine is separated from said reaction chamber by maintaining isothermal conditions such that iodine condenses in situ upon its creation.

12. In a process for the production of hydrogen from water, wherein $H_2O$, $SO_2$ and $I_2$ are reacted to produce sulfuric acid and hydrogen iodide and wherein hydrogen is recovered from said hydrogen iodide following further treatment thereof, wherein the improvement comprises carrying out said reaction at a temperature above about −60° C. with sulfur dioxide and iodine present in a stoichiometric excess with respect to the reacting water so as to cause two distinct aqueous phases to be formed, a lighter sulfuric acid-bearing phase and a heavier hydrogen iodide-bearing phase, said lighter phase containing most of said sulfuric acid which is produced and said heavier phase containing most of said hydrogen iodide which is produced, and separating said heavier phase from said lighter phase before treating said hydrogen iodide to effect said recovery of hydrogen.

13. A process in accordance with claim 12 wherein iodine is present in an amount equal to at least about 2 grams per each gram the total amount of water.

14. A process is accordance with claim 12 wherein said iodine is present in at least a near saturation amount.

15. A process in accordance with claim 12 wherein said reaction is carried out under a pressure of $SO_2$ equal to at least about 1 atmosphere.

* * * * *